US012643121B2

(12) United States Patent
Nalin et al.

(10) Patent No.: US 12,643,121 B2
(45) Date of Patent: Jun. 2, 2026

(54) SYSTEM FOR APPLYING A COATING TO A WORKPIECE

(71) Applicant: ARMSTRONG WORLD INDUSTRIES, INC., Lancaster, PA (US)

(72) Inventors: Sebastien G. Nalin, London (GB); Scott L. Huntzinger, Lancaster, PA (US); John J. Hartman, Jr., Millersville, PA (US); Lida Lu, Coraopolis, PA (US); Eric D. Kragness, Sinking Spring, PA (US)

(73) Assignee: AWI Licensing LLC, Wilmington, DE (US)

( * ) Notice: Subject to any disclaimer, the term of this patent is extended or adjusted under 35 U.S.C. 154(b) by 0 days.

(21) Appl. No.: 18/622,534

(22) Filed: Mar. 29, 2024

(65) Prior Publication Data

US 2024/0238828 A1 Jul. 18, 2024

Related U.S. Application Data

(63) Continuation of application No. 17/896,364, filed on Aug. 26, 2022, now Pat. No. 11,951,509, which is a (Continued)

(51) Int. Cl.
*B05C 5/02* (2006.01)
*B05B 1/14* (2006.01)
(Continued)

(52) U.S. Cl.
CPC .............. *B05C 5/0254* (2013.01); *B05B 1/14* (2013.01); *B05B 1/30* (2013.01); *B05C 5/0204* (2013.01);
(Continued)

(58) Field of Classification Search
CPC .................. B05C 5/0204; B05C 5/022; B05C 5/0254–0266; B05C 9/06; B05C 9/08;
(Continued)

(56) References Cited

U.S. PATENT DOCUMENTS 3,077,859 A 2/1963 Cook
4,333,417 A 6/1982 Camp et al.
(Continued)

FOREIGN PATENT DOCUMENTS

CN 101417272 A 4/2009
DE 3740201 6/1989
(Continued)

*Primary Examiner* — Cody J Lieuwen
(74) *Attorney, Agent, or Firm* — Patrick Sheldrake

(57) ABSTRACT

An applicator head for a vacuum coating system includes a manifold shell having opposing shell plates, each including a conduit attachment coupled to a shell aperture. An applicator manifold is affixed to each shell plate. Each applicator manifold includes two coupled manifold plates, with one including a manifold aperture, and each is affixed to the respective shell plate so that each manifold aperture aligns with the respective shell aperture. An applicator channel is formed between the manifold plates of each applicator manifold, and the applicator channel is fluidically coupled to the manifold aperture of each respective applicator manifold. Each applicator channel forms an applicator port at a leading edge of each respective applicator manifold, and each leading edge is configured to be complementary in shape to an edge of a workpiece to be coated. First and second face plates are disposed over the leading edges of the applicator manifolds.

17 Claims, 8 Drawing Sheets

Related U.S. Application Data continuation of application No. 16/872,566, filed on May 12, 2020, now Pat. No. 11,458,502, which is a continuation of application No. 15/925,525, filed on Mar. 19, 2018, now Pat. No. 10,688,520, which is a continuation of application No. 14/793,842, filed on Jul. 8, 2015, now Pat. No. 9,919,335, which is a continuation of application No. 14/023,095, filed on Sep. 10, 2013, now Pat. No. 9,266,141, application No. 18/622,534 is a continuation of application No. 14/023,130, filed on Sep. 10, 2013, now abandoned, and a continuation of application No. 14/023,147, filed on Sep. 10, 2013, now abandoned, and a continuation of application No. 14/023,152, filed on Sep. 10, 2013, now abandoned, and a continuation of application No. 14/023,115, filed on Sep. 10, 2013, now abandoned.

(51) Int. Cl.

| | |
|---|---|
| ***B05B 1/30*** | (2006.01) |
| *B05B 1/04* | (2006.01) |
| *B05B 14/00* | (2018.01) |
| *B05C 9/06* | (2006.01) |
| *B05C 9/08* | (2006.01) |

(52) U.S. Cl.
CPC ............... *B05B 1/044* (2013.01); *B05B 14/00* (2018.02); *B05C 9/06* (2013.01); *B05C 9/08* (2013.01)

(58) Field of Classification Search
CPC .. B05B 1/044; B05B 1/14; B05B 1/28; B05B 1/30
See application file for complete search history.

(56) References Cited

U.S. PATENT DOCUMENTS

| | | | | |
|---|---|---|---|---|
| 4,857,367 | A | 8/1989 | Thorn et al. | |
| 4,943,451 | A * | 7/1990 | Zimmer | B05C 9/04 427/244 |
| 5,078,080 | A | 1/1992 | Schiele | |
| 5,298,072 | A * | 3/1994 | Schiele | B05C 11/10 118/314 |
| 5,443,638 | A | 8/1995 | Gartmann et al. | |
| 5,882,409 | A | 3/1999 | Stahl | |
| 5,976,249 | A * | 11/1999 | Stahl | B05C 5/0254 118/DIG. 11 |
| 8,584,611 | B2 | 11/2013 | Pfitzner et al. | |
| 8,979,785 | B2 | 3/2015 | Korogi et al. | |
| 2006/0081174 | A1 | 4/2006 | Baran | |
| 2008/0035477 | A1 | 2/2008 | Gawer et al. | |
| 2008/0213477 | A1 | 9/2008 | Zindel et al. | |
| 2009/0169751 | A1 | 7/2009 | Gasworth | |
| 2011/0059257 | A1 * | 3/2011 | Shibata | H10F 71/00 427/427.3 |
| 2011/0189402 | A1 | 8/2011 | Wagner | |
| 2011/0274838 | A1 | 11/2011 | Yuste et al. | |
| 2012/0132345 | A1 | 5/2012 | Reichert | |
| 2012/0196045 | A1 | 8/2012 | Fraley | |

FOREIGN PATENT DOCUMENTS

| | | | |
|---|---|---|---|
| DE | 4021174 | | 1/1992 |
| IT | FI20090093 | A1 | 11/2010 |
| JP | H06182848 | A | 7/1994 |
| JP | 2011067795 | A | 4/2011 |
| RU | 2006127550 | A | 3/2008 |
| RU | 2011130842 | A | 2/2013 |
| RU | 2011151632 | A | 6/2013 |
| WO | 89/10430 | | 11/1989 |
| WO | 02/26467 | A2 | 4/2002 |

* cited by examiner

SYSTEM FOR APPLYING A COATING TO A WORKPIECE

CROSS REFERENCE TO RELATED APPLICATIONS

This application is a continuation of U.S. patent application Ser. No. 17/896,364 filed Aug. 26, 2022, which is a continuation of U.S. patent application Ser. No. 16/872,566 filed May 12, 2020, which is a continuation of U.S. patent application Ser. No. 15/925,525, filed Mar. 19, 2018, which is a continuation of U.S. patent application Ser. No. 14/793,842, filed Jul. 8, 2015 (now U.S. Pat. No. 9,919,335). This application is a continuation of U.S. patent application Ser. No. 14/023,095, filed Sep. 10, 2013 (now U.S. Pat. No. 9,266,141). This application is also a continuation of U.S. patent application Ser. No. 14/023,115, filed Sep. 10, 2013. This application is a continuation of U.S. patent application Ser. No. 14/023,130, filed Sep. 10, 2013. This application is a continuation of U.S. patent application Ser. No. 14/023,147, filed Sep. 10, 2013. This application is a continuation of U.S. patent application Ser. No. 14/023,152, filed Sep. 10, 2013. The disclosures of the above applications are incorporated herein by reference in their entireties.

FIELD OF THE INVENTION

The field of the present invention relates to systems for applying a coating to a workpiece with a sprayed liquid.

BACKGROUND OF THE INVENTION

Edge-coating a workpiece as it moves along in a direction generally parallel to its edge is generally known. Systems have been developed that spray the passing edge with a liquid and then vacuum the excess liquid off the edge in order to obtain a very smooth and uniform coating of the liquid on edge of the workpiece.

U.S. Pat. No. 5,298,072 describes a system for coating the edges of panels (and other types and forms of workpieces) in which the panel is moved along a conveyor past a painting station, so that the edge of the panel moves longitudinally past the applicator head, which serves as both a spray head to apply the paint and a vacuum head to remove excess paint. The applicator head is shaped to have a complementary shape to the shape of the edge of the panel, and as the panel moves past the applicator head, paint is applied and excess paint is removed to leave the smooth finish.

Problems with this prior art system are found in uneven coating of the applied liquid on the workpiece, undesired buildup of the liquid on parts of the system itself, downtime for maintenance, and cost of maintenance itself. All of these issues may be addressed by one or more improvements in such systems.

SUMMARY OF THE INVENTION

The present invention is directed toward a system for applying a coating to a workpiece. The workpiece is conveyed past the applicator head so that the edge of the workpiece is positioned adjacent and exposed to the applicator head. The applicator head dispenses a liquid onto the edge of the workpiece and establishes a vacuum to remove excess liquid from the edge, thereby coating the edge with the liquid. The applicator head includes an applicator manifold, which includes two manifold plates and an applicator channel formed therebetween. The applicator channel opens up to an applicator port at a leading edge of the applicator manifold, and liquid is dispensed through the applicator port. At the leading edge of the applicator manifold, the manifold plates are configured to be complementary in shape to the edge of the workpiece on which liquid is being coated. Face plates are disposed over the leading edges of the applicator manifold to cover a portion of the applicator port.

In a first separate aspect of the present invention, the applicator head includes a manifold shell having opposing shell plates, and each shell plate includes a shell aperture and a conduit attachment coupled to the shell aperture. An applicator manifold is affixed to at least one of the shell plates. One of the manifold plates of the applicator manifold includes a manifold aperture which aligns with the shell aperture, so that the applicator channel is fluidically coupled to the manifold aperture and to the shell aperture, thereby enabling a liquid to flow from the conduit attachment to the applicator channel.

In a second separate aspect of the present invention, one of the two manifold plates has a greater width than the other manifold plate at the leading edge of the applicator manifold. The one manifold plate may have a width that is twice as wide, or even more, as the other manifold plate.

In a third separate aspect of the present invention, the face plates may include a beveled edge over the applicator port. These beveled edges may face the applicator port, and they may form a point.

In a fourth separate aspect of the present invention, the applicator channel includes a surface in which a flow channel is formed. Such a flow channel may be configured to direct more of the liquid being applied to the edge of a workpiece toward a portion of the applicator port.

In a fifth separate aspect of the present invention, the leading edge of the applicator manifold is configured with a first portion which is complementary in shape to the edge of the workpiece to form a first application gap, and a second portion which is complementary in shape to the edge of the workpiece to form a second application gap, with the second application gap being different than the first application gap.

In a sixth separate aspect of the present invention, any of the foregoing aspects may be employed singly or in any desired combination.

Accordingly, an improved system for applying a coating to a workpiece is disclosed. Advantages of the improvements will be apparent from the drawings and the description of the preferred embodiment.

BRIEF DESCRIPTION OF THE DRAWINGS

The foregoing summary, as well as the following detailed description of the exemplary embodiments, will be better understood when read in conjunction with the appended drawings. It should be understood, however, that the invention is not limited to the precise arrangements and instrumentalities shown in the following figures.

DETAILED DESCRIPTION OF THE INVENTION

Figure 1:
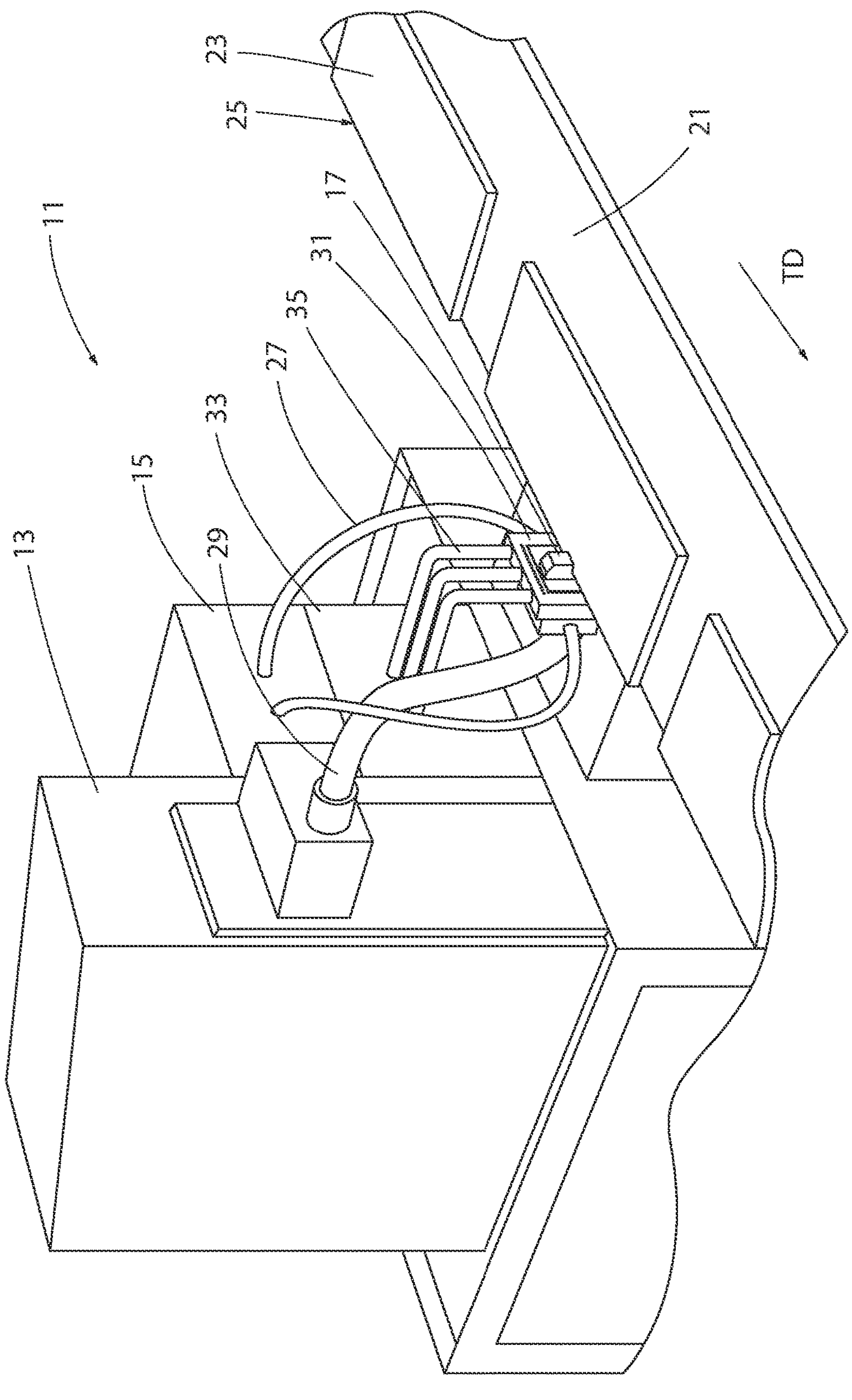
FIG. 1 is a perspective view of an edge coating apparatus.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "left," "right," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combinations of features that may exist alone or in other combinations of features; the scope of the invention being defined by the claims appended hereto.

In the context of the description below, the liquid is discussed in terms of a water-based paint. However, as is known to those of skill in the art, the liquid can also be a primer, a lacquer, a preservative, or any other desired treatment liquid that is appropriate as a coating for a particular workpiece and the intended utilization of that workpiece. In addition, the liquid may serve as a carrier for solid or filler particles. For example, the filler particles may have an average particle size ranging from about 100 microns to 600 microns, and the liquid carrier may have a composition of up to 90% of filler particles by dry solids weight. Examples of filler particles includes calcium carbonate, dolomite, dolomitic limestone or combinations thereof. In addition to the solid or filler particles, the liquid may also include as part of its composition a binder and/or a pigment, as desired by design choice for a particular coating application. Examples of binders that may be included in the liquid include natural polymers, modified natural polymers, synthetic polymers and combinations thereof. The synthetic polymers are formed from the following monomers: vinyl acetate, vinyl propionate, vinyl butyrate, ethylene, vinyl chloride, vinylidine chloride, vinyl fluoride, vinylidine fluoride, ethyl acrylate, methyl acrylate, propyl acrylate, butyl acrylate, ethyl methacrylate, methyl methacrylate, butyl methacrylate, hydroxyethyl methacrylate, styrene, butadiene, urethane, epoxy, melamine, ester, and combinations thereof. U.S. Pat. No. 7,033,963, the disclosure of which is incorporated herein by reference in its entirety, describes other examples of liquids that may be used with the coating system described below. The coating system may also be used with other types of liquids (and liquid compositions), other than those referenced herein.

Turning in detail to FIG. 1, a vacuum coating system 11 includes a vacuum tank 13 and a paint feed apparatus 15, and both are coupled to an edge-coating applicator head 17. The applicator head 17 is arranged adjacent a conveyor 21 which transports workpieces 23 past the applicator head 17, in a transport direction, TD, so that the edges 25 of the workpieces 23 can be coated. The paint feed apparatus 15 feeds paint through conduits 27 into the applicator head 17, and the vacuum tank 13 establishes a vacuum through a vacuum line 29 coupled to the back side of the applicator head 17. The operation of such a vacuum coating system 11 is known in the art, and background details may be found in U.S. Pat. No. 5,298,072, the disclosure of which is incorporated herein by reference in its entirety. A steam manifold 31 may be affixed to the applicator head 17. The steam manifold 31 is coupled to a steam source 33 by steam supply conduits 35. The steam manifold 31 may be included to maintain a moist environment in and around the applicator head 17 in order to help avoid a build-up of dried paint during operation.

Figure 2:
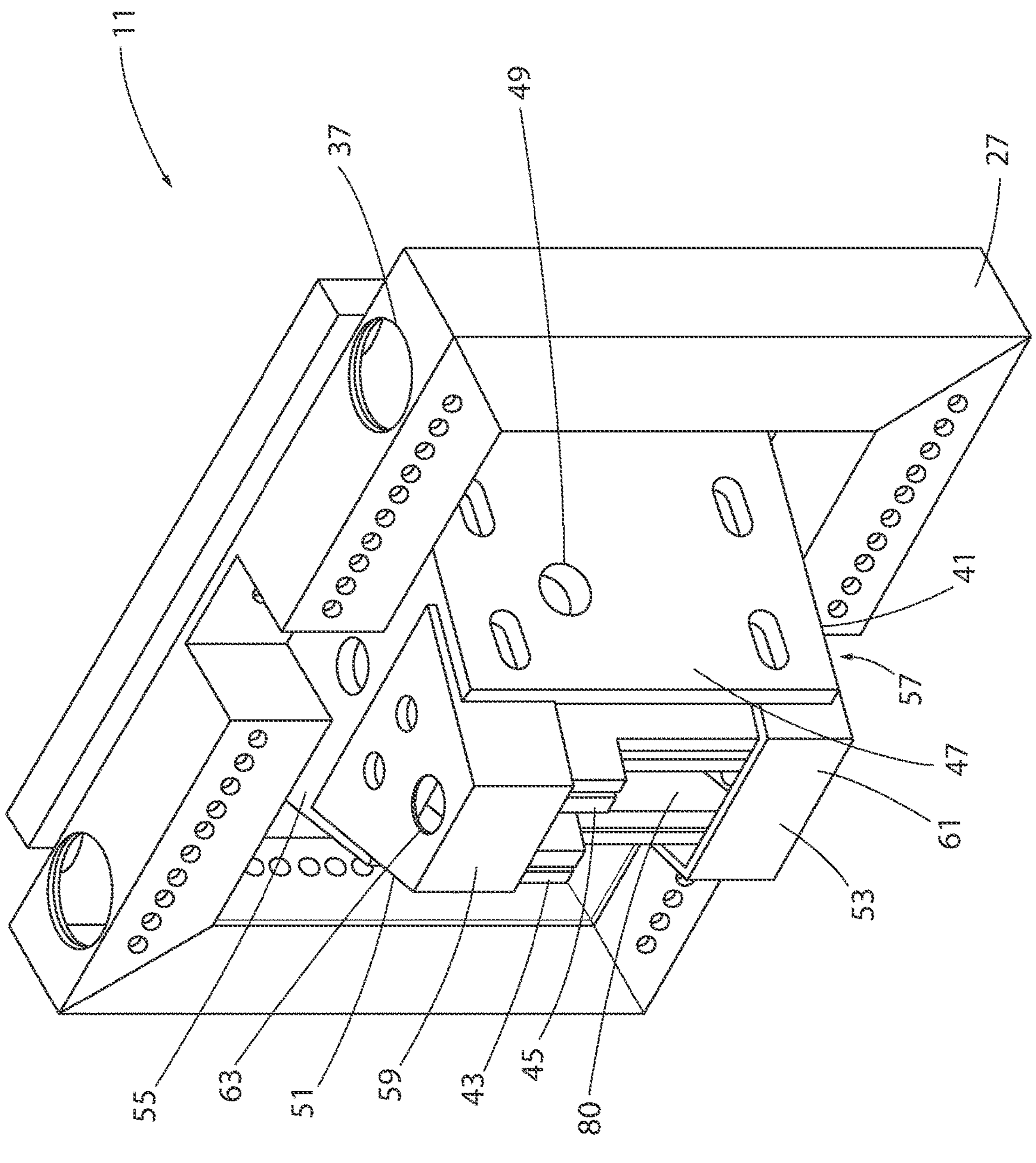
FIG. 2 is a perspective view of an applicator head for an edge coating apparatus.

FIG. 2 shows a detailed view of the applicator head 17, which includes a manifold shell 41 around which is disposed the steam manifold 31. Steam may be directed into the steam manifold 31 by connecting a steam conduit to inlet ports 37. The manifold shell 41 supports two applicator manifolds 43, 45, each of which is affixed to one of two opposing side shell plates 47. Both applicator manifolds 43, 45 are removably affixed to the side shell plates 47 by bolts passing through the shell plates 47 and into threaded holes provided in each applicator manifold 43, 45, thereby facilitating maintenance and replacement of the applicator manifolds as needed. Each shell plate 47 includes a shell aperture 49 which is positioned to align with a corresponding manifold aperture in each of the applicator manifolds 43, 45. Top and bottom covers 51, 53 are secured, respectively, to the top and bottom shell plates 55, 57 of the manifold shell 41. Each top and bottom cover 51, 53 includes a face plate 59, 61 which extends over both of the applicator manifolds 43, 45, and each may include an additional steam port 63 through which steam may be directed between the two applicator manifolds 43, 45.

Figure 3:
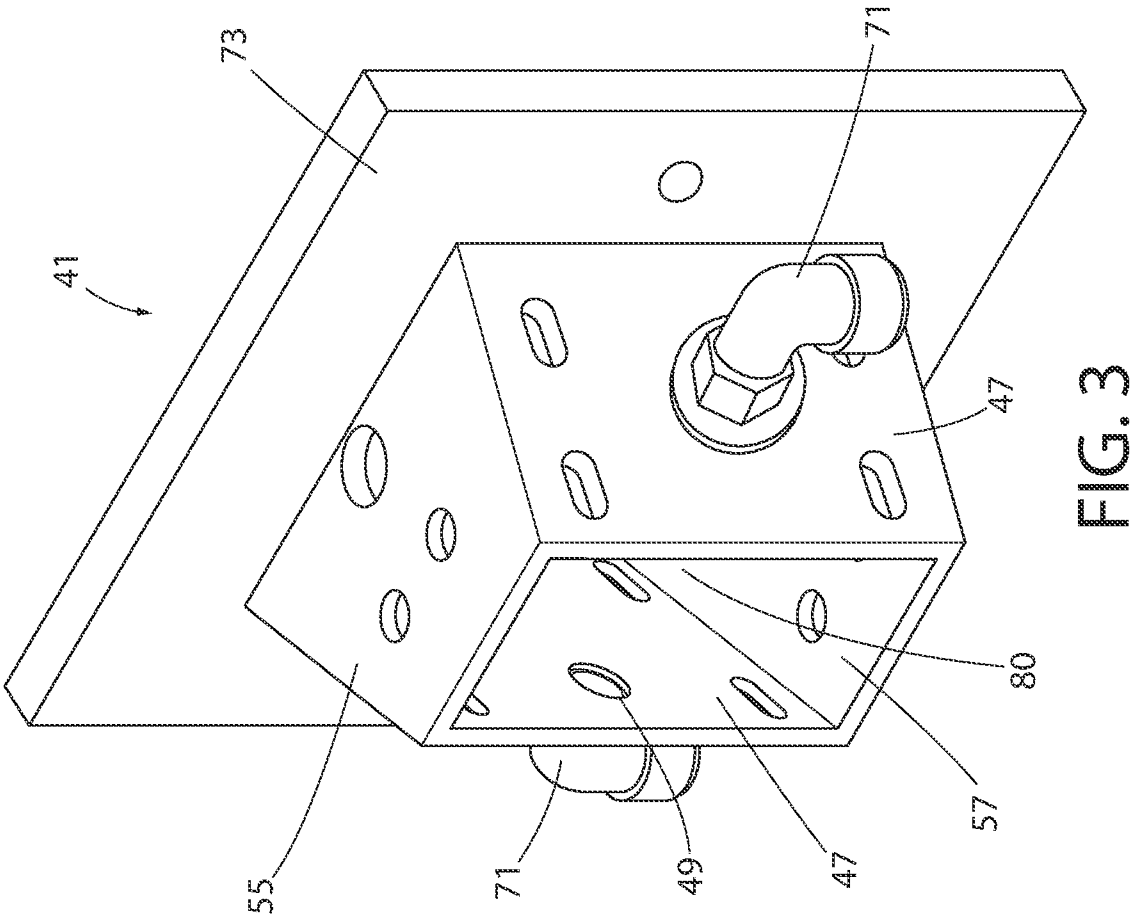
FIG. 3 is a perspective view of a manifold shell for the applicator head of FIG. 2.

The manifold shell 41 with conduit attachments 71 coupled to the each of the shell apertures 49 is shown in FIG. 3. Each conduit attachment 71 is affixed to the manifold shell 41 over the shell aperture 49 so that paint may pass from the conduits and into each of the applicator manifolds during operation. Paint supply conduit (not shown) is connected to each conduit attachment 71 during operation. The top and bottom shell plates 55, 57 include attachment holes for the top and bottom covers, respectively. The side, top, and bottom shell plates 47, 55, 57 are all affixed to the backing plate 73, which also serves as a cover plate for a vacuum chamber 80, so that a vacuum may be established during operation within the interior space defined by the side, top, and bottom shell plates 47, 55, 57.

Figure 4:
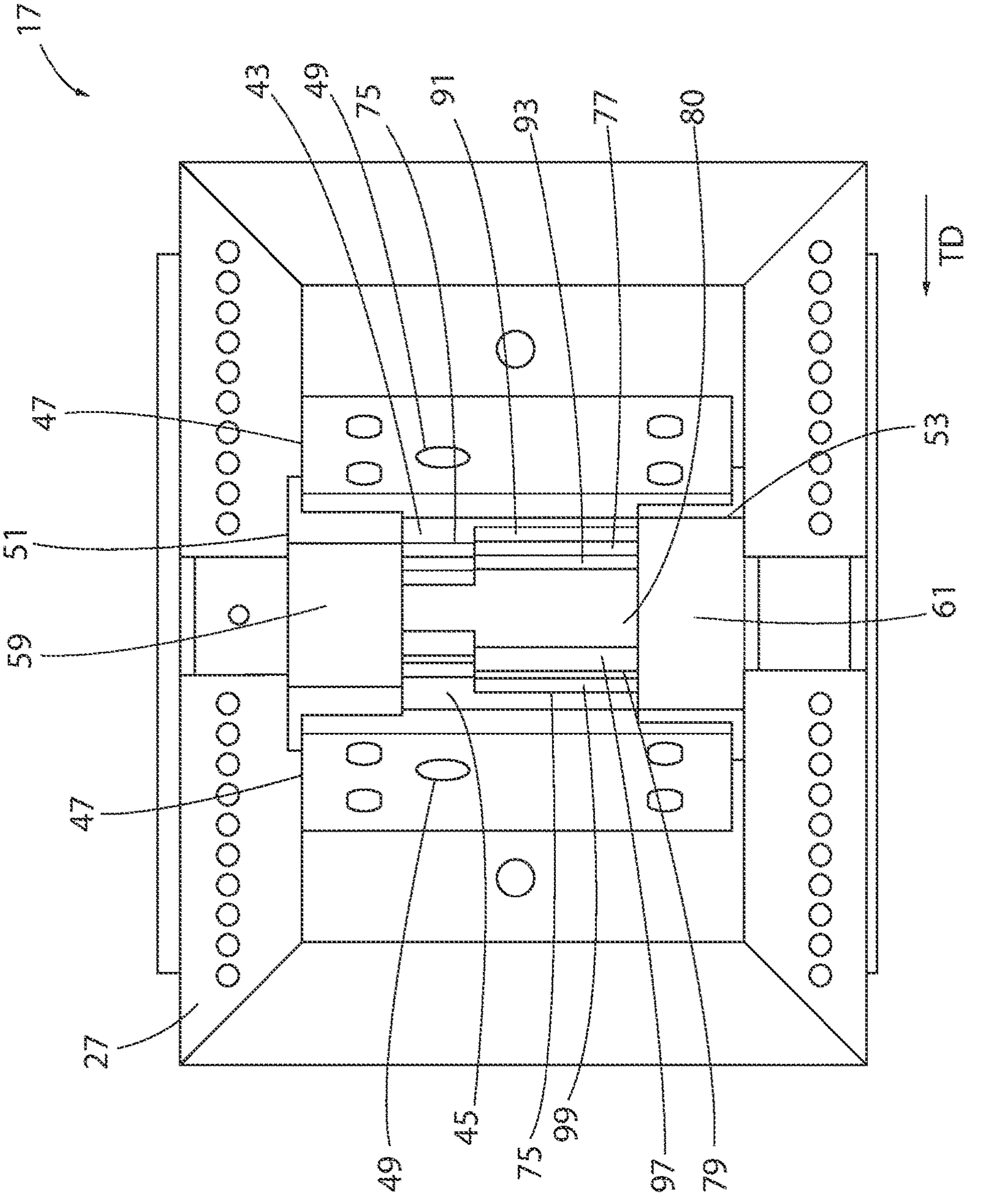
FIG. 4 is a front elevation view of the applicator head of FIG. 1.

FIG. 4 shows the assembled applicator head 17 with the applicator manifolds 43, 45 and the top and bottom covers 51, 53 in place; no fasteners, i.e., bolts, screws, etc., are shown in order to simplify the illustration. The exposed part of the leading edges 75 of the applicator manifolds 43, 45 are configured to have a shape which is complementary to the edge of a workpiece conveyed past the applicator head 17 (see the discussion of FIGS. 5-9 below for more about the applicator manifolds). Applicator ports 77, 79, through which paint is dispensed during operation, are formed at the leading edges 75 of each applicator manifold 43, 45. The top and bottom covers 51, 53, each include a face plate 59, 61 which extends over the leading edges 75 of the applicator manifolds 43, 45. The face plates 59, 61 each cover a portion of the applicator ports 77, 79, so that the exposed portion of the applicator ports 77, 79 closely match, but are not smaller than, the dimension of the edge of the workpieces being conveyed past the applicator head.

The embodiment shown facilitates maintenance and replacement of the applicator manifolds. Whereas with applicator heads of the prior art, when the leading edge began to wear, or a different tooling is needed to coat the edges of a workpiece having a different profile, the entire applicator head would need to be replaced. With the applicator head disclosed herein, the applicator manifolds themselves are replaceable, and the manifold shell and the steam conduit may remain in place with the rest of the system.

The applicator manifolds of the embodiment shown in FIG. 4 are easily removed by first detaching the top and bottom covers from the manifold shell, then removing the bolts that secure each applicator manifold to the manifold shell. This allows the applicator manifolds to be removed, and when appropriate, a new applicator manifold inserted in place of the old one. Once the top and bottom covers are secured in place once more, then the coating system may be up and running again. The ease of changing out the applicator manifolds facilitates replacing a worn out part, and it facilitates "retooling" the applicator head to coat a workpiece having a different edge profile by inserting applicator manifolds configured with a shape to match the profile of the new workpiece.

During operation, as the edge of a workpiece is conveyed past the applicator head 17 to coat the workpiece, an application gap between the leading edge of the applicator manifold and the edge of the workpiece is maintained within a predetermined range. As used herein, "application gap" is the horizontal spacing between complementary points on the leading edge of the applicator manifold and the surface profile of the edge of the workpiece being conveyed past the applicator head. In the embodiment shown in FIG. 4, the applicator manifolds are configured to have a constant application gap between the leading edge of the applicator manifold and the edge of the workpiece. As is discussed below, depending upon the workpiece, advantages may be obtained by having the leading edge of one or more of the applicator manifolds configured to have different application gaps with different portions of the edge of a workpiece.

When a selected liquid, such as paint, is being applied to a particular workpiece, the application gap is one of the variables that may be adjusted to help control the thickness and consistency of the coating being applied to the edge of the workpiece. Generally, the application gap may be within the range of what is referred to as an "operational window" in order to obtain satisfactory results. For an application of paint, the satisfactory results may be based upon the amount of paint applied and the application resulting in a substantially uniform appearance. Other variables which may be taken into consideration for determining the operational window of a particular configuration, in addition to the application gap, include the viscosity of the paint, the pressure at which the paint is pumped into the applicator manifolds, and the rate at which the workpiece is moved past the applicator head.

By way of example, a test was performed using an applicator head of the prior art (i.e., the applicator ports were integrally formed as part of the applicator head and there was no steam manifold) to apply paint to a workpiece, with the workpiece conveyance rate set to 50 feet per minute and the vacuum established at the applicator head, the following acceptable operational ranges were empirically identified:

Pump Pressure Range: 5.3 bar-7.3 bar

Relative Head Position: −0.007 in.-0.008 in.

The zero point, or center position, for the applicator head was empirically determined in advance as the relative position between the edge of the workpiece and the applicator head that provided the most visually acceptable and color accurate results. When these test results using a prior art applicator head are compared to other test results presented below, it can be seen how improvements to a coating system may be realized by making one or more changes in the configuration of the applicator head.

Returning to FIG. 4, the direction of workpiece conveyance is indicated by the arrow. The edge of a workpiece is conveyed initially past the first applicator manifold 43, and then next past the second applicator manifold 45. The first applicator manifold 43 is formed by two manifold plates 91, 93, both of which have the same width at the leading edge of the applicator manifold 43. The applicator port 77 is formed between the two manifold plates 91, 93, and this applicator port 77 has the same width as the two manifold plates 91, 93. The second applicator manifold 45 is also formed by two manifold plates 97, 99, which do not have the same width. The applicator port 79 is formed between the two manifold plates 97, 99, and the applicator port 79 and the second manifold plate 99 have the same width. The first manifold plate 97 has a greater width than the second manifold plate 99. The width of the first manifold plate 97 may be 50% or greater than the width of the first manifold plate 99. Although limited testing was run, it is expected that the difference in widths between these two manifold plates of the exit-side applicator manifold may have a broad range of adjustment, depending upon the other variables, such as those discussed herein, with which the applicator head is configured and used with.

By way of a another example, a second test was performed using an applicator head with replaceable applicator manifolds and a steam manifold providing steam around the applicator head during testing. The applicator plates of each applicator manifold had a thickness of 0.100 in., and the widths of the applicator ports were the same, at 0.100 in. The paint used to coat the edge of the workpiece was more viscous than the paint used in the first test, the workpiece conveyance rate was set to 50 feet per minute, and the vacuum was established at the applicator head. With these settings, the following acceptable operational ranges were empirically identified:

Pump Pressure Range: 5.5 bar-6.8 bar

Relative Head Position: −0.007 in.-0.007 in.

As is not surprising, most of the ranges for this second test are about the same as the ranges for the first test, which was performed using an applicator head of the prior art.

By way of another example, a third test was performed using an applicator head with replaceable applicator manifolds and a steam manifold providing steam around the applicator head during testing. The applicator plates of the first applicator manifold (the edge of the workpiece passes by the first applicator manifold first for purposes of this test) had a thickness of 0.100 in., as did the thickness of the applicator port of the first applicator manifold. The first applicator plate of the second applicator manifold had a thickness of 0.100 in., as did the thickness of the applicator port of the second applicator manifold. The second applicator plate (the lead-in plate to the second applicator manifold, based on the travel direction of the workpiece) of the second applicator manifold had a thickness of 0.200 in. The paint used to coat the edge of the workpiece was more viscous than the paint used in the first test, the workpiece conveyance rate was set to 50 feet per minute, and the vacuum was established at the applicator head. With these settings, the following acceptable operational ranges were empirically identified:

Pump Pressure Range: 4.0 bar-6.0 bar

Relative Head Position: –0.016 in.-0.016 in.

By way of another example, a fourth test was performed using an applicator head with replaceable applicator manifolds and a steam manifold providing steam around the applicator head during testing. The applicator plates of the first applicator manifold (the edge of the workpiece passes by the first applicator manifold first for purposes of this test) had a thickness of 0.100 in., as did the thickness of the applicator port of the first applicator manifold. The second applicator plate of the second applicator manifold had a thickness of 0.100 in., as did the thickness of the applicator port of the second applicator manifold. The first applicator plate (the lead-in plate to the second applicator manifold, based on the travel direction of the workpiece) of the second applicator manifold had a thickness of 0.275 in. The paint used to coat the edge of the workpiece was more viscous than the paint used in the first test, the workpiece conveyance rate was set to 50 feet per minute, and the vacuum was established at the applicator head. With these settings, the following acceptable operational ranges were empirically identified:

Pump Pressure Range: 3.7 bar-6.0 bar

Relative Head Position: –0.010 in.-0.014 in.

As can be seen from the third and fourth tests, the absolute pump pressure ranges remained about the same, while the lower and upper ends of the pump pressure ranges were reduced by 1.3 bar each. In addition, the absolute range for the relative head position was more than doubled in the third test, and the absolute range for the relative head position was increased by about 66% in the fourth test. This data shows that significant improvements in the operational efficiencies of an edge coating system may be realized merely by increasing the thickness of the one manifold plate.

Figure 5:
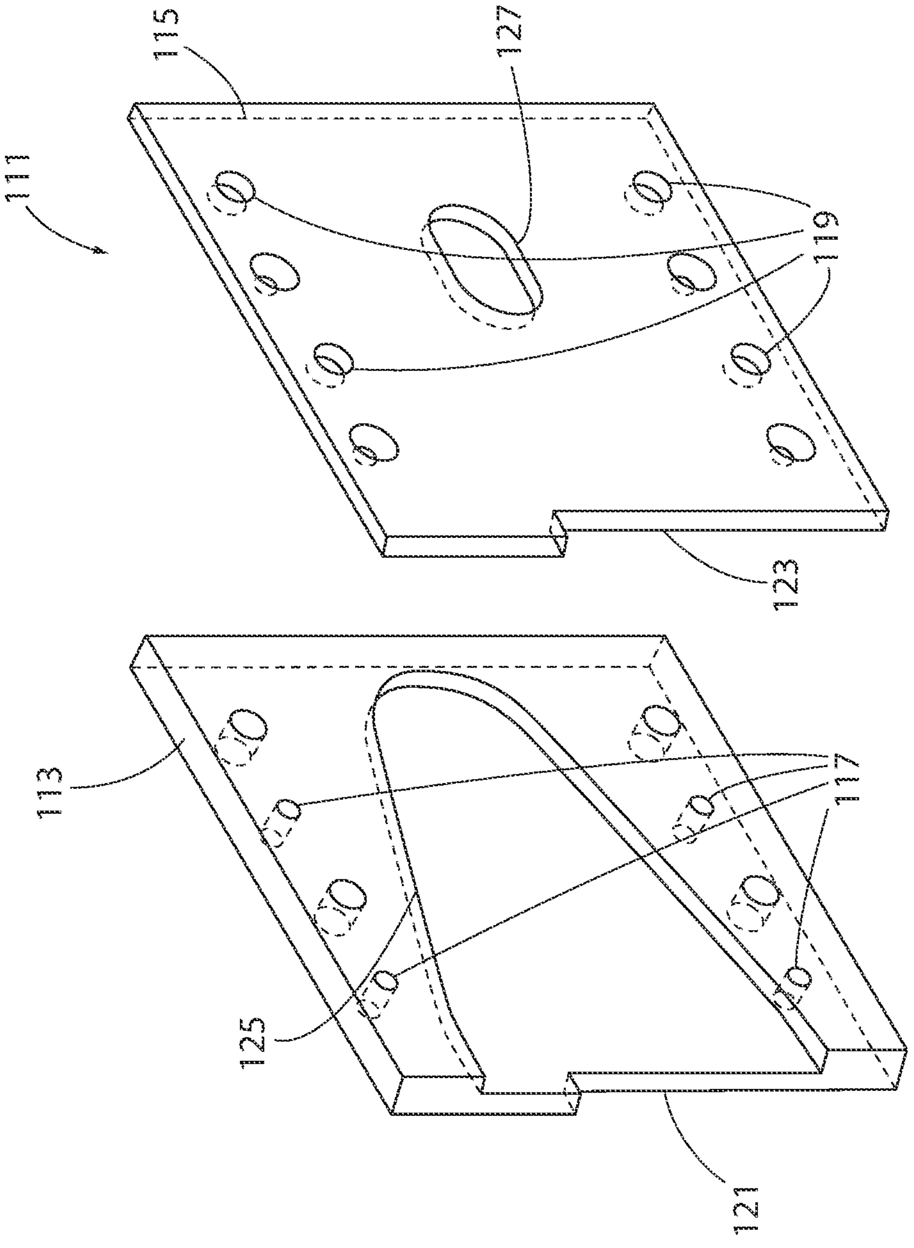
FIG. 5 is an exploded view of an applicator manifold for the applicator head of FIG. 2.
Figure 6:
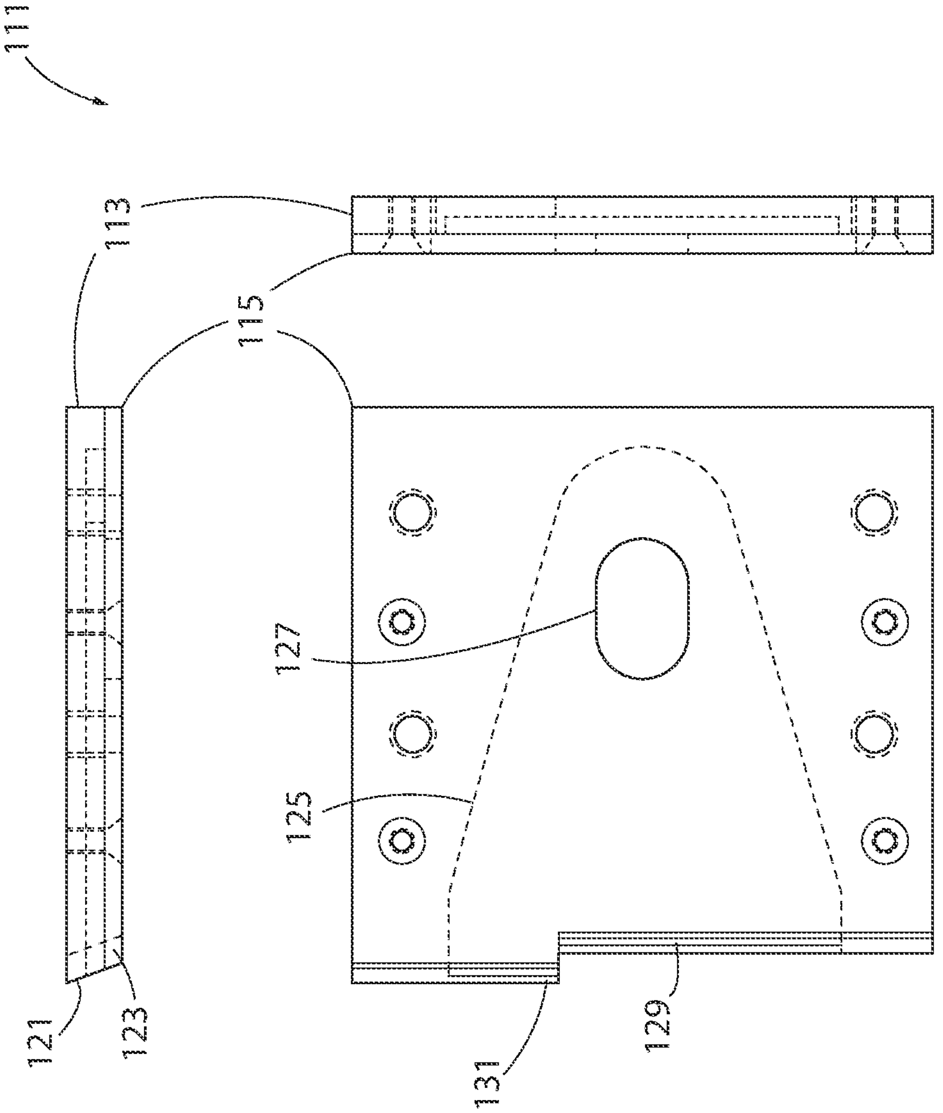
FIG. 6 is a multiview orthographic projection showing three sides of the applicator manifold of FIG. 5.

Turning back to the figures, FIG. 5 illustrates an applicator manifold 111 formed by two applicator plates 113, 115. Both applicator plates 113, 115 include a first set of screw holes 117 for fastening the plates together, and a second set of screw holes 119 for securing the plates to the side shell plate of the manifold shell. Both applicator plates 113, 115 have leading edges 121, 123 that are configured to be complementary in shape to the edge of a workpiece to be coated using the applicator manifold 111. When the applicator plates 113, 115 are secured together, as is shown in FIG. 6, the edges 121, 123 of the two applicator plates 113, 115 form the leading edge of the applicator manifold 111. One applicator plate 113 includes an applicator channel 125, while the other applicator plate 115 includes a manifold aperture 127. When the applicator plates 113, 115 are secured together, the manifold aperture 127 is fluidically coupled to the applicator channel 125. The applicator plate 115 with the manifold aperture 127 is disposed nearest the side shell plate when the applicator manifold 111 is secured within the manifold shell. This aligns the manifold aperture 127 with the shell aperture in the manifold shell, so that liquid, such as paint, can flow from the liquid conduit through to the applicator channel 125, and out through the applicator port.

Multiple elevation views of the applicator manifold 111, assembled, are shown in FIG. 6. Here, the fluidic coupling between the manifold aperture 127, the applicator channel 125, and the applicator port 129 is shown, which enables the liquid to flow from the liquid conduit out through the applicator port. Also highlighted in these views is the leading edge 131 of the applicator manifold 111. This leading edge 131 is angled to account for the angle that the applicator manifold 111 is mounted within the manifold shell relative to the path of the workpieces as they are conveyed past the applicator head.

Figure 7:
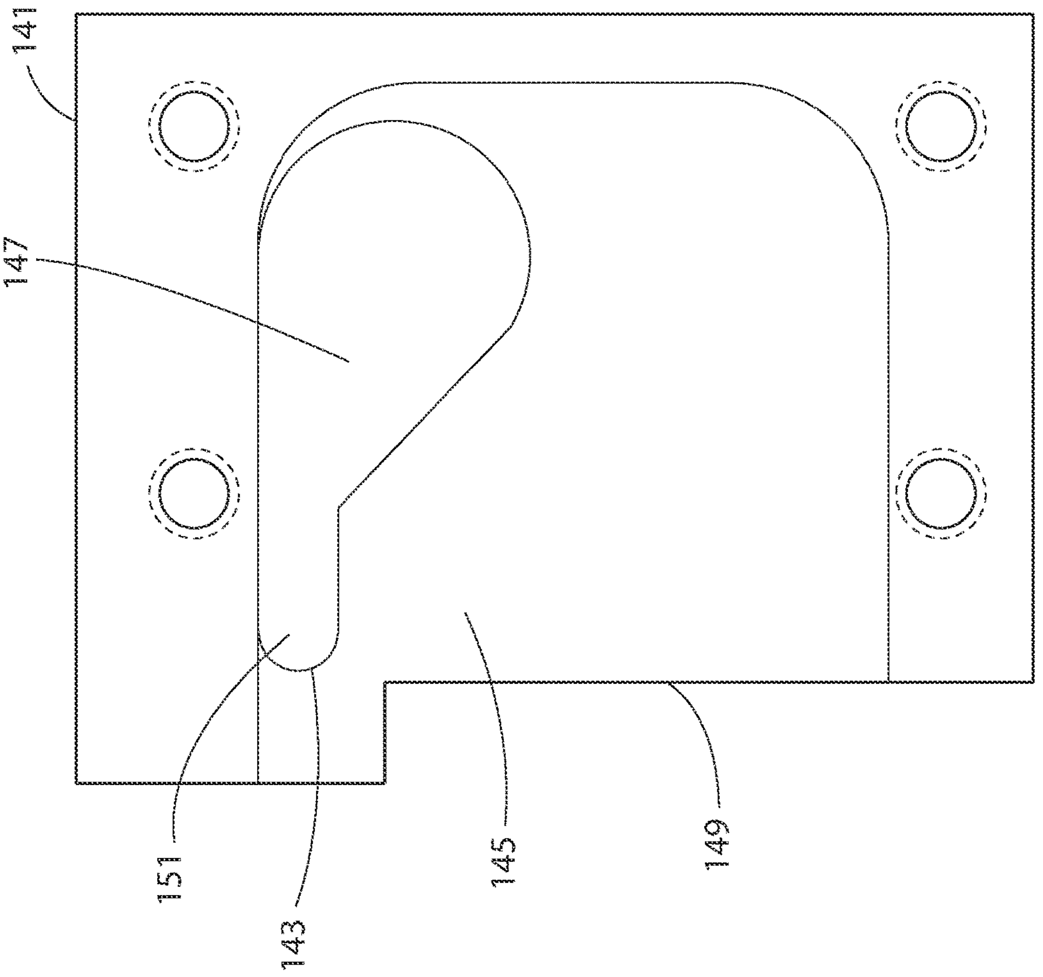
FIG. 7 is a side elevation view of a manifold plate showing the applicator channel.

FIG. 7 shows another modification to an applicator plate 141 which may be used to create a better flow distribution of the liquid emerging from the applicator port. This modification introduces a flow channel 143 in a surface of the applicator channel 145, which itself is formed in the applicator plate 141. The flow channel 143 creates an enlarged space within the applicator channel 145, and this enlarged space may take on any appropriate shape and be used to direct additional liquid toward part of the edge of the workpiece being coated. As shown, the flow channel 143 has an enlarged body portion 147 disposed away from the leading edge 149 of the applicator plate 141, with a finger portion 151 extending in the direction of, but not extending to, the leading edge 149.

It has been found that gravity may often cause the liquid being coated onto a workpiece to have a greater volume of flow at the bottom of an applicator port than it does at the top of an applicator port. The flow channel shown in FIG. 7, which is disposed near the top of the applicator channel and includes the finger portion extending toward the top of the applicator port, increases the flow of liquid to the top of the applicator port. This increased flow can help offset the effects of gravity during the application process.

Flow channels may be almost any shape and size within the applicator channel, and multiple flow channels may also be incorporated into the applicator channel. The shape, size, and number of flow channels are highly dependent upon the desired properties of the coating for the particular workpiece being coated. These factors may include the shape of the edge of the workpiece, the desired distribution of and/or finish qualities for the liquid on the edge, the type and qualities of the liquid being applied, the desired rate of application, among many other factors.

Figure 8:
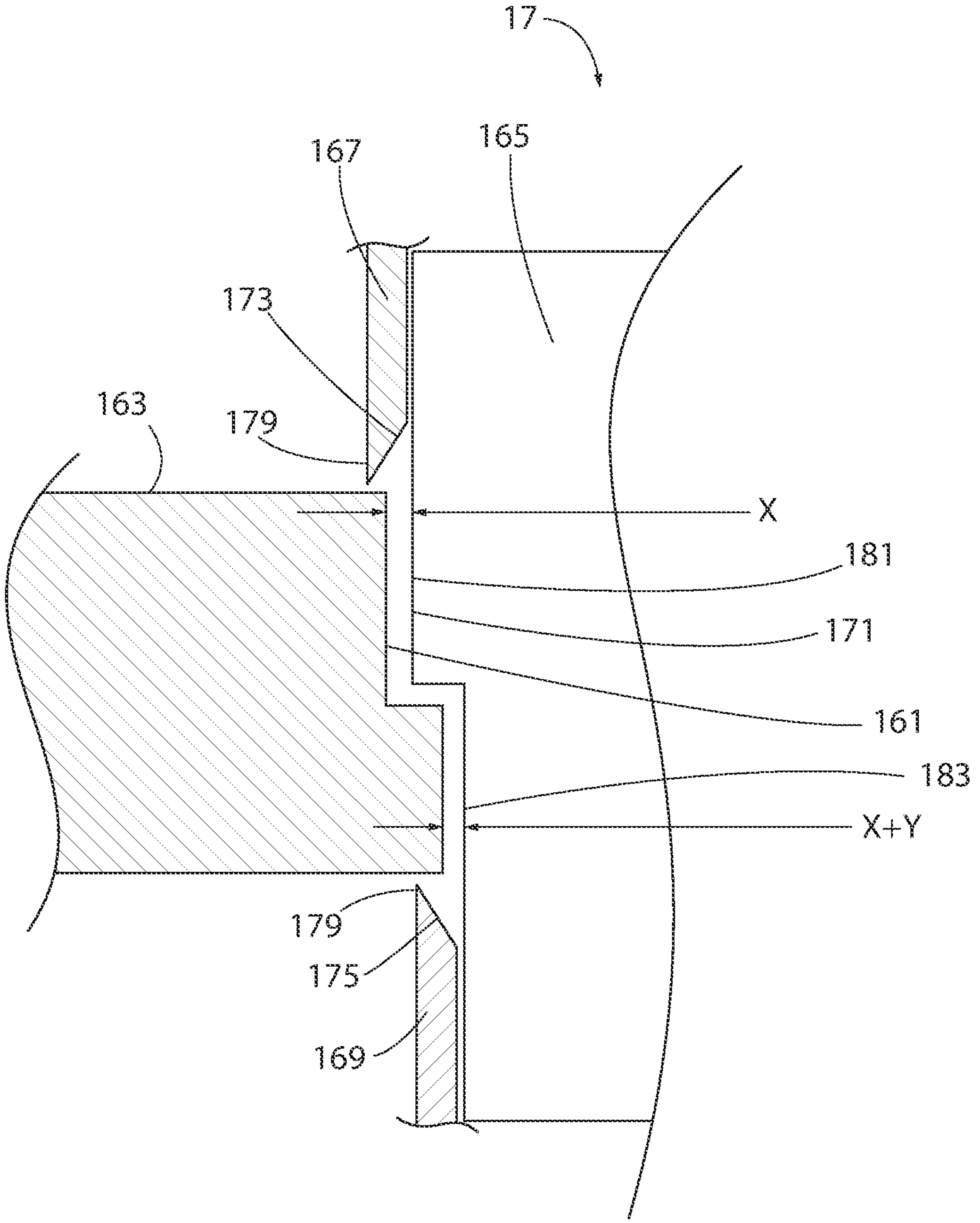
FIG. 8 is detail view of the edge of a workpiece passing by an applicator head.

Two other modifications which may be made to an applicator head to improve the coating process are shown in the detailed view of an applicator head 17 illustrated in FIG. 8. These modifications may be made individually or in combination with any other modification discussed herein. The applicator head 17 is shown adjacent the edge 161 of a workpiece 163 being coated with a liquid. The applicator head 17 includes the applicator manifold 165 and the face plates 167, 169 extending down over the leading edge 171 of the applicator manifold 165. Each face plate 167, 169 include a beveled edge 173, 175 which is disposed over the applicator port 177 formed at the leading edge 171 of the applicator manifold 165. These beveled edges 173, 175 are positioned with the bevel facing the leading edge 171 of the applicator manifold 165, and each beveled edge 173, 175 forms a point 179.

It has been found that by including the beveled edges in the face plates, the air flow being drawn into the applicator head by the vacuum is improved around these edges of the face plates. This improved air flow leads to less liquid being deposited on the top and bottom surfaces of the workpiece, which in turn leads to a better visual appearance for the top and bottom surfaces of the workpiece.

The second improvement is in the application gap formed between the leading edge 161 of the applicator manifold 165 and the edge of the workpiece 163. Typically, the applicator manifold is configured so that the application gap is a constant along the entire edge of the workpiece being coated. The applicator manifold 17 may instead include an applicator manifold which has a first part 181 of its leading edge 171 configured with a first application gap and a second part 183 of its leading edge configured with a second application gap, with the two application gaps being different from each other. To accomplish this, when coating the edge of a particular workpiece, the applicator manifold is configured to have a first application gap which is at a constant, X, and it is configured to have a second application gap which is at the constant plus an additional factor, X+Y, where Y is a non-zero distance, measured in length, which may be positive or negative. For example, measured in inches, Y may be 0.010 in., which would enable use of this modification with the applicator head used in the second test above, since the absolute range of the operational window for that test was 0.014 in. By way of another example, Y may be 0.015 or greater, up to about 0.030, which would enable use of this modification with the applicator head used in the third test above, since the absolute range of the operational window for that test was 0.032 in.

By configuring the applicator manifold to have different application gaps with respect to the edge of a workpiece, the effects of gravity on the flow of a liquid in the applicator channel may be compensated. By way of example, as shown in FIG. 8, the bottom portion of the applicator manifold may be configured to have an application gap that is greater than the application gap formed at the top portion of the applicator manifold, so that the top portion of the edge of the workpiece has more liquid deposited thereon than does the bottom portion of the edge. In this way, the finish of the coating may be better balanced, and therefore have a more even appearance, across the entire edge of the workpiece. As a further option, for an applicator head which includes two or more applicator manifolds, each applicator manifold may be configured to have different application gaps with respect to the edge of the same workpiece.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A vacuum coating system comprising:

an applicator head comprising an applicator manifold having an applicator port at a leading side surface of the applicator manifold; and a workpiece having an edge profile;

wherein when the workpiece is conveyed past the applicator head, a first portion of the leading side surface is configured to be complementary in shape to a first portion of the edge profile of the workpiece forming a first application gap, and a second portion of the leading side surface is configured to be complementary in shape to a second portion of the edge profile of the workpiece forming a second application gap, wherein the first application gap defines a first spacing distance between the leading side surface and the edge profile at the first portion, the first spacing distance being measured along a line normal to the leading side surface, and the second application gap defines a second spacing distance between the leading side surface and the edge profile at the second portion, the second spacing distance being measured along a line normal to the leading side surface; and the first spacing distance is different from the second spacing distance.

2. The vacuum coating system of claim 1, wherein the difference between the first application gap and the second application gap is at least 0.010 inches.

3. The vacuum coating system of claim 1, wherein the applicator manifold comprises:

a first manifold plate including a manifold aperture fluidically coupled to a conduit; and a second manifold plate affixed to the first manifold plate, wherein an applicator channel is formed between the first and second manifold plates, and wherein the applicator channel is fluidically coupled to the manifold aperture and forms the applicator port at the leading edge of the applicator manifold.

4. The vacuum coating system of claim 3, wherein the applicator head comprises:

a first face plate and a second face plate, each of the first and second face plates disposed over the leading edge of the applicator manifold, thereby covering at least a portion of the applicator port, wherein the first face plate includes a first beveled edge, the second face plate includes a second beveled edge, and each of the first and second beveled edges is disposed over the applicator port.

5. The vacuum coating system of claim 4, wherein each of the first and second beveled edges faces the applicator port.

6. The vacuum coating system of claim 3, further comprising:

a second applicator manifold comprising:

a third manifold plate including a second manifold aperture fluidically coupled to a second conduit; and a fourth manifold plate affixed to the third manifold plate, wherein a second applicator channel is formed between the third and fourth manifold plates, wherein the second applicator channel is fluidically coupled to the second manifold aperture and forms a second applicator port at a second leading edge of the second applicator manifold, the second leading edge is configured to be complementary in shape to the edge of the workpiece.

7. The vacuum coating system of claim 6, wherein the fourth manifold plate has a greater width than the third manifold plate at the second leading edge adjacent the second applicator port.

8. The vacuum coating system of claim 1, further comprising a vacuum line coupled to the applicator head.

9. The vacuum coating system of claim 1, wherein the applicator head comprises an applicator plate coupled to the applicator manifold, the applicator plate including a leading edge, wherein the applicator plate comprises a flow channel and the flow channel includes an enlarged body portion disposed away from the leading edge of the applicator plate with a finger portion extending in a direction of the leading edge of the applicator plate.

10. A vacuum coating system comprising:

an applicator head comprising an applicator manifold having an applicator port at a leading side surface of the applicator manifold; and a workpiece having an edge profile;

wherein when the work piece is conveyed past the applicator head, a first portion of the leading side surface is configured to be complementary in shape to a first portion of the edge profile of the workpiece forming a first application gap, and a second portion of the leading side surface is configured to be complementary in shape to a second portion of the edge profile of the workpiece forming a second application gap, wherein the first application gap and the second application gap are not equal, wherein the applicator manifold comprises:

a first manifold plate including a manifold aperture fluidically coupled to a conduit; and a second manifold plate affixed to the first manifold plate, wherein an applicator channel is formed between the first and second manifold plates, and wherein the applicator channel is fluidically coupled to the manifold aperture and forms the applicator port at the leading edge of the applicator manifold, wherein the vacuum coating system further comprises a second applicator manifold comprising:

a third manifold plate including a second manifold aperture fluidically coupled to a second conduit; and a fourth manifold plate affixed to the third manifold plate, wherein a second applicator channel is formed between the third and fourth manifold plates, wherein the second applicator channel is fluidically coupled to the second manifold aperture and forms a second applicator port at a second leading edge of the second applicator manifold, the second leading edge is configured to be complementary in shape to the edge of the workpiece, wherein the vacuum coating system further comprises a manifold shell having a first shell plate and a second shell plate opposing the first shell plate, the first shell plate including a first shell aperture and a first conduit attachment coupled to the first shell aperture, and the second shell plate including a second shell aperture and a second conduit attachment coupled to the second shell aperture, wherein the first applicator manifold is affixed to the first shell plate so that the first conduit is fluidically coupled to the first manifold aperture through the first shell aperture, and the second applicator manifold is affixed to the second shell plate so that the second conduit is fluidically coupled to the second manifold aperture through the second shell aperture.

11. The vacuum coating system of claim 10, wherein the difference between the first application gap and the second application gap is at least 0.010 inches.

12. The vacuum coating system of claim 10, wherein the applicator head comprises:

a first face plate and a second face plate, each of the first and second face plates disposed over the leading edge of the applicator manifold, thereby covering at least a portion of the applicator port, wherein the first face plate includes a first beveled edge, the second face plate includes a second beveled edge, and each of the first and second beveled edges is disposed over the applicator port.

13. The vacuum coating system of claim 12, wherein each of the first and second beveled edges faces the applicator port.

14. The vacuum coating system of claim 10, wherein the fourth manifold plate has a greater width than the third manifold plate at the second leading edge adjacent the second applicator port.

15. The vacuum coating system of claim 10, further comprising a vacuum line coupled to the applicator head.

16. The vacuum coating system of claim 10, wherein the applicator head comprises an applicator plate coupled to the applicator manifold, the applicator plate including a leading edge, wherein the applicator plate comprises a flow channel and the flow channel includes an enlarged body portion disposed away from the leading edge of the applicator plate with a finger portion extending in a direction of the leading edge of the applicator plate.

17. A method for coating a workpiece, the method comprising:

conveying an edge of the workpiece past an applicator head, the workpiece comprising a first major surface opposite a second major surface and the edge extending between the first and second major surfaces, and the applicator head comprising:

an applicator manifold removably affixed to a manifold shell, the applicator manifold in fluid communication with a vacuum source and a paint feed;

a first applicator port coupled to the applicator manifold and in fluid communication with the paint feed;

a second applicator port coupled to the applicator manifold and in fluid communication with the paint feed; and a vacuum line in fluid communication with the vacuum source and positioned adjacent at least one of the first applicator port and the second applicator port, wherein the applicator head further comprises an applicator plate coupled to the applicator manifold, the applicator plate including a leading edge, wherein the applicator plate comprises a flow channel and the flow channel includes an enlarged body portion disposed away from the leading edge of the applicator plate with a finger portion extending in a direction of the leading edge of the applicator plate;

directing a liquid onto the edge of the workpiece using the applicator head; and removing excess liquid through a vacuum established around the applicator head.

* * * * *